(12) United States Patent
Mathrubootham et al.

(10) Patent No.: US 10,671,739 B2
(45) Date of Patent: Jun. 2, 2020

(54) MANAGING THE SHARING OF COMMON LIBRARY PACKAGES WITH SUBSCRIBERS

(71) Applicant: salesforce.com, inc., San Francisco, CA (US)

(72) Inventors: Ganesh Mathrubootham, Dublin, CA (US); Jeffrey M. Bartolotta, San Francisco, CA (US); Reid A. Elliott, Denver, CO (US)

(73) Assignee: salesforce.com, inc., San Francisco, CA (US)

( * ) Notice: Subject to any disclaimer, the term of this patent is extended or adjusted under 35 U.S.C. 154(b) by 222 days.

(21) Appl. No.: 15/873,587

(22) Filed: Jan. 17, 2018

(65) Prior Publication Data
US 2019/0220608 A1 Jul. 18, 2019

(51) Int. Cl.
| G06F 21/00 | (2013.01) |
| G06F 21/60 | (2013.01) |
| G06F 8/60 | (2018.01) |
| G06F 21/31 | (2013.01) |
| G06F 21/10 | (2013.01) |
| G06F 8/36 | (2018.01) |

(52) U.S. Cl.
CPC .............. *G06F 21/604* (2013.01); *G06F 8/60* (2013.01); *G06F 21/10* (2013.01); *G06F 21/31* (2013.01); *G06F 21/606* (2013.01); *G06F 8/36* (2013.01)

(58) Field of Classification Search
CPC ........ G06F 21/604; G06F 21/10; G06F 21/31; G06F 21/606; G06F 8/60; G06F 8/36
See application file for complete search history.

(56) References Cited

U.S. PATENT DOCUMENTS

| 5,586,304 | A | * | 12/1996 | Stupek, Jr. .............. G06F 8/658 717/170 |
| 5,983,227 | A | | 11/1999 | Nazem et al. |
| 6,216,133 | B1 | | 4/2001 | Masthoff |
| 6,236,978 | B1 | | 5/2001 | Tuzhilin |
| 6,288,717 | B1 | | 9/2001 | Dunkle |
| 6,411,949 | B1 | | 6/2002 | Schaffer |
| 6,907,566 | B1 | | 6/2005 | McElfresh et al. |
| 7,062,502 | B1 | | 6/2006 | Kesler |
| 7,100,111 | B2 | | 8/2006 | McElfresh et al. |

(Continued)

OTHER PUBLICATIONS

Final Office Action for U.S. Appl. No. 12/437,418, dated Apr. 16, 2012.

(Continued)

*Primary Examiner* — Sarah Su
(74) *Attorney, Agent, or Firm* — LKGlobal | Lorenz & Kopf, LLP

(57) ABSTRACT

A method for securely sharing a common software package includes storing, within a database, a set of software packages associated with a first namespace, then storing, within the database, a common software package associated with the set of software packages. The common software package is obfuscated and includes an access modifier. A request to install a first software package selected from the set of software packages associated with the namespace is received by a subscriber. In response to the request from the subscriber, the system installs the first software package and the common software package in accordance with the access modifier.

20 Claims, 3 Drawing Sheets

(56) References Cited

U.S. PATENT DOCUMENTS

| | | | |
|---|---|---|---|
| 7,203,738 B1* | 4/2007 | McGill | G06F 8/60 709/219 |
| 7,269,590 B2 | 9/2007 | Hull et al. | |
| 7,373,599 B2 | 5/2008 | McElfresh et al. | |
| 7,401,094 B1 | 7/2008 | Kesler | |
| 7,406,501 B2 | 7/2008 | Szeto et al. | |
| 7,454,509 B2 | 11/2008 | Boulter et al. | |
| 7,599,935 B2 | 10/2009 | La Rotonda et al. | |
| 7,603,331 B2 | 10/2009 | Tuzhilin et al. | |
| 7,644,122 B2 | 1/2010 | Weyer et al. | |
| 7,668,861 B2 | 2/2010 | Steven | |
| 7,747,648 B1 | 6/2010 | Kraft et al. | |
| 7,827,208 B2 | 11/2010 | Bosworth et al. | |
| 7,853,881 B1 | 12/2010 | Aly Assal et al. | |
| 7,856,445 B2 | 12/2010 | Gross | |
| 7,945,653 B2 | 5/2011 | Zuckerberg et al. | |
| 7,991,764 B2 | 8/2011 | Rathod | |
| 8,005,896 B2 | 8/2011 | Cheah | |
| 8,073,850 B1 | 12/2011 | Hubbard et al. | |
| 8,103,611 B2 | 1/2012 | Tuzhilin et al. | |
| 8,150,913 B2 | 4/2012 | Cheah | |
| 8,166,013 B2 | 4/2012 | Bandaru et al. | |
| 8,601,467 B2* | 12/2013 | Hofhansl | G06F 8/60 717/177 |
| 9,348,576 B2* | 5/2016 | Hofhansl | G06F 8/60 |
| 9,916,429 B2* | 3/2018 | Hess | G06F 21/10 |
| 2001/0029605 A1* | 10/2001 | Forbes | G06F 8/61 717/170 |
| 2004/0260589 A1* | 12/2004 | Varadarajan | G06Q 10/0631 705/7.18 |
| 2005/0289264 A1* | 12/2005 | Illowsky | G06F 1/3203 710/104 |
| 2006/0036570 A1* | 2/2006 | Schaefer | G06F 9/44505 |
| 2006/0206449 A1* | 9/2006 | Fletcher | G06F 8/61 |
| 2008/0010270 A1 | 1/2008 | Gross | |
| 2008/0028390 A1* | 1/2008 | Fors | G06F 8/61 717/174 |
| 2008/0147487 A1 | 6/2008 | Hirshberg | |
| 2008/0209320 A1 | 8/2008 | Mawhinney et al. | |
| 2010/0125502 A1 | 5/2010 | Solomon et al. | |
| 2010/0217757 A1 | 8/2010 | Fujioka | |
| 2010/0241576 A1 | 9/2010 | Been | |
| 2011/0197287 A1* | 8/2011 | Hess | G06F 21/10 726/30 |
| 2011/0209067 A1 | 8/2011 | Bogess et al. | |
| 2011/0258204 A1 | 10/2011 | Hubbard et al. | |
| 2012/0108207 A1* | 5/2012 | Schell | H04L 63/0853 455/411 |
| 2012/0290407 A1 | 11/2012 | Hubbard et al. | |
| 2014/0359605 A1* | 12/2014 | Leet | G06F 21/10 717/178 |
| 2015/0363179 A1* | 12/2015 | Anderson | G06F 8/61 717/121 |
| 2016/0132214 A1* | 5/2016 | Koushik | H04L 63/10 715/741 |
| 2017/0264667 A1* | 9/2017 | Thomas | H04L 67/1095 |
| 2018/0034924 A1* | 2/2018 | Horwood | H04L 67/40 |
| 2018/0210727 A1* | 7/2018 | Elliott | G06F 8/71 |
| 2019/0235852 A1* | 8/2019 | Bartolotta | G06F 8/41 |
| 2019/0236292 A1* | 8/2019 | Bartolotta | G06F 8/30 |

OTHER PUBLICATIONS

Final Office Action for U.S. Appl. No. 12/356,429, dated May 2, 2012.

Notice of Allowance for U.S. Appl. No. 12/819,402, dated May 14, 2012.

Non-Final Office Action for U.S. Appl. No. 13/453,802, dated Jun. 8, 2012.

Linear Combination-Wikipedia (http://en.wikipedia.org/wiki/Linear_Combination (accessed Jul. 16, 2012).

* cited by examiner

MANAGING THE SHARING OF COMMON LIBRARY PACKAGES WITH SUBSCRIBERS

TECHNICAL FIELD

Embodiments of the subject matter described herein relate generally to the installation and sharing of software code. More particularly, embodiments of the subject matter relate to sharing common library packages with subscribers in such a way that the actual code is not exposed to these subscribers.

BACKGROUND

Protecting proprietary information and intellectual property such as source code software is very important to organizations involved in software development and management. However, it is often important for developers and users (e.g., partners within a particular organization) to develop and share common library packages of the type that might be used by multiple applications and by multiple subscribers.

Accordingly, it is desirable to provide improved systems and methods for sharing common library packages with subscribers in such a way that those subscribers cannot access the software code itself. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

A method for securely sharing a common software package includes storing, within a database, a set of software packages associated with a first namespace, then storing, within the database, a common software package associated with the set of software packages. The common software package is obfuscated and includes an access modifier. A request to install a first software package selected from the set of software packages associated with the namespace is received from a subscriber. In response to the request from the subscriber, the system installs the first software package and the common software package in accordance with the access modifier. In this way, a common software library or package can be distributed to a subscriber without allowing the subscriber visibility to the software code itself.

A database system in accordance with one embodiment includes a processor in communication with a memory element that has computer executable instructions stored thereon. The instructions are configurable to be executed by the processor to cause the database system to: store, within a database, a set of software packages associated with a first namespace; store, within the database, a common software package associated with the set of software packages, the common software package being obfuscated and including an access modifier; receiving, from a subscriber, a request to install a first software package selected from the set of software packages associated with the namespace; and in response to the request from the subscriber, installing the first software package and the common software package in accordance with the access modifier.

Figure 1:
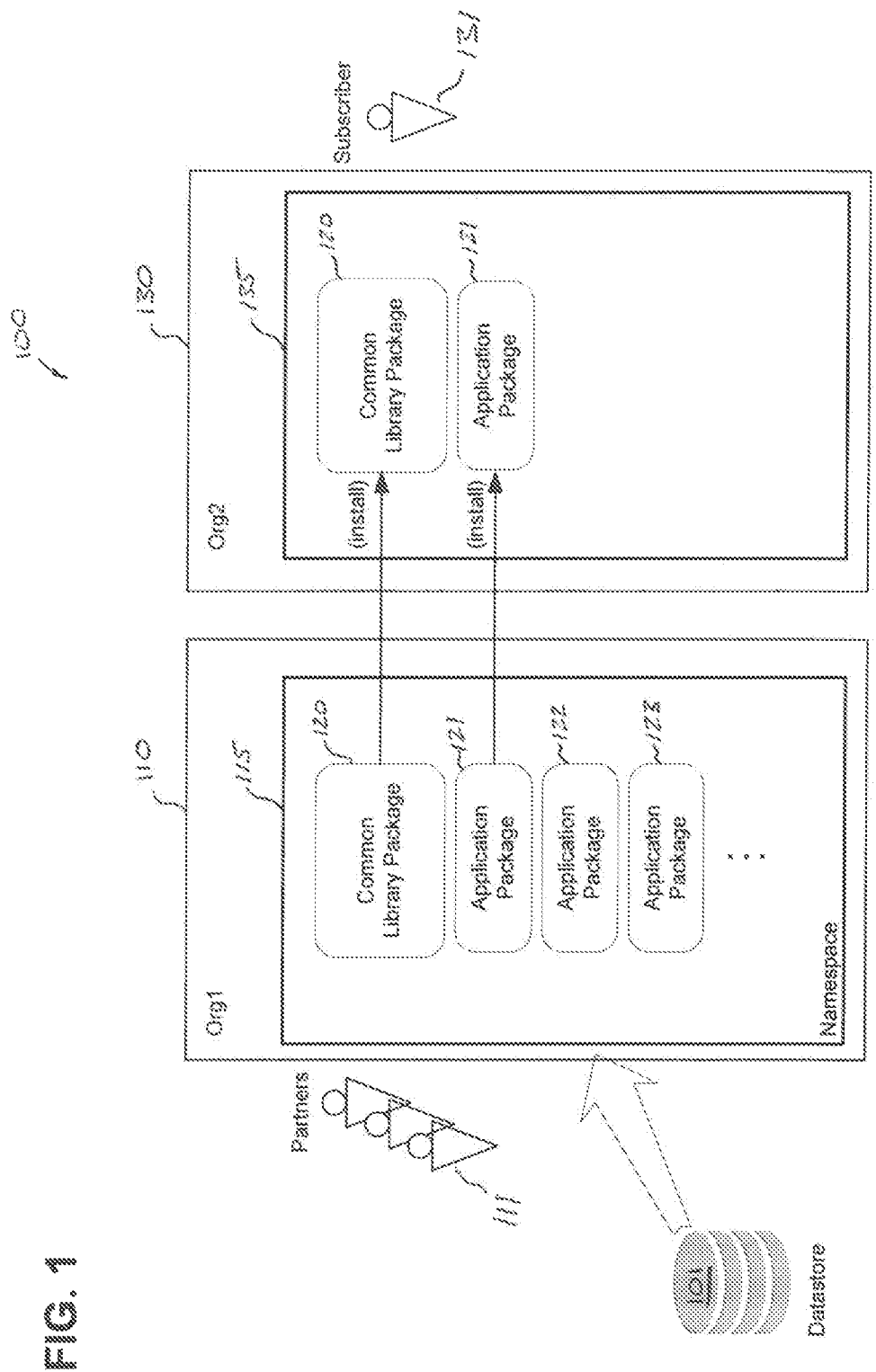
FIG. 1 is a block diagram showing an exemplary embodiment of a system for sharing common library packages.

Turning now to FIG. 1, a block diagram showing an exemplary embodiment of a system 100 includes a database or datastore 101, within which various organizations or "orgs" 110, 130 are defined, as discussed in further detail below. One or more "partners" 111 have access to or are otherwise associated with organization 110, while a subscriber 131 (e.g., an individual, partnership, corporation, etc.) is associated with organization 130. One or more application packages 120, 121, 122, 123 are developed (e.g., by partners 111) within a common namespace 115. Subscriber 131 will generally also be associated with a separate namespace 135, as shown.

In some embodiments, a namespace (e.g., 115 and 135) is a globally unique string across production instances (as depicted in the multi-tenant architecture described below). Partners may be expected to reserve a particular namespace using an existing mechanism provided within the hosting system.

As shown, namespace 115 includes a common library package 120 (also referred to as a "utility package" or "common package service"), which includes software code that can be used by multiple application packages 121, 122, 123. That is, rather than replicating certain functionality within each application package 121-123, common library package 120 provides such functionality, and can be installed once by a subscriber 131 and used by each of the associated application packages 121-123. Common library package 120 may provide a wide range of functionality, for example, locationing services (GPS, WiFi, etc.), networking services, sensor interfaces, common user interface components, and the like.

In accordance with various embodiments, when an application package (e.g., 121) is installed by a subscriber 131 (as shown, within namespace 135), the associated common library package 120 is also installed, either transparently or with explicit permission of subscriber 131. In such cases, the installation of subsequent packages (e.g., packages 122 and 123) would typically include determining whether the required common library package 120 has already been installed within namespace 135. If so, then only the application package itself is installed. If not, installation of the common library package 120 takes place using any convenient method.

In accordance with various embodiments, common library package 120 is obfuscated. As used herein, the term "obfuscated" means that the code (e.g., source code) is either unviewable by a user or is rendered into a substantially non-human-readable form. This obfuscation may be accomplished in a variety of ways. In some embodiments, for example, a text representation of a global signature for the code is returned (i.e., visible by a user), but the contents are not. The term "signature" (or "method signature") as used herein refers to a specification of the input and output of a function or method. Such signatures might include, for example, parameters and their types, return value(s) and type, exceptions that might be thrown or passed back, and information regarding the availability of a method (e.g., global, public, static, prototype, etc.)

In accordance with various embodiments, available interfaces for common library package 120 are provided with a specific, non-global access modifier that allows common library package 120 (e.g., its methods, variables, etc.) to be accessed by associated application packages 121-123. As used herein, the term "access modifier" refers to a syntactical element, e.g., a keyword, that sets the accessibility of classes, methods, and other members of an object in an object-oriented language. Application packages that are not developed within namespace 115 and/or are not associated with common library package 120 will not have access to the interfaces of common library package 120. In some embodiments, a new keyword, annotation, or access modifier is employed. The two examples that follow illustrate, first, an example class utilizing a new keyword as its access modifier, and second, an example class utilizing an annotation as an access modifier.

```
// Example of new keyword
namespace public class MyClass {
}
// Example of annotation
@Namespace("TheNamespace")
public class MyClass {
}
```

Figure 2:
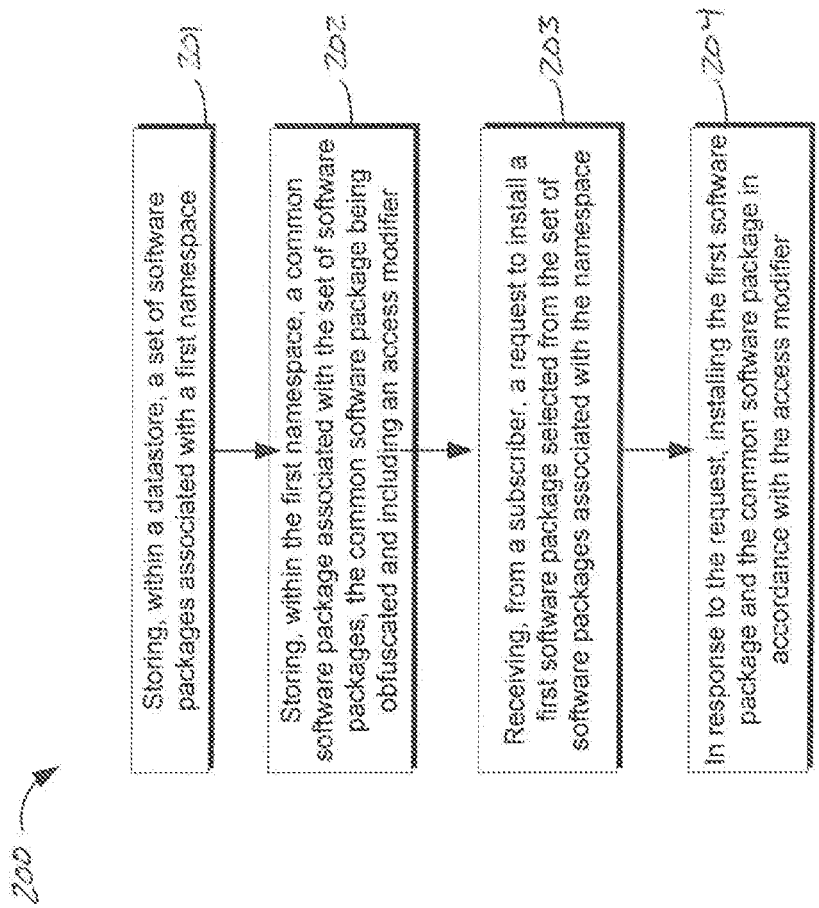
FIG. 2 is a flow chart of an exemplary embodiment of a method for allowing an independent software vendor (ISV) to access hidden proprietary software code.

Turning now to FIG. 2, with continued reference to FIG. 1, a flowchart is shown of an exemplary embodiment of a method 200 for sharing common library packages (such as 120 in FIG. 1). First, at 201, a set of application packages (e.g., 121-123) are developed and/or stored within a particular namespace (e.g., 115) of database (e.g., 101). Similarly, at 202, a common software package (e.g., 120) associated with application packages 121-123 is also stored within namespace 115. As discussed above, common software package 120 is obfuscated and includes an access modifier that allows interface "visibility" only to application packages (e.g., 121-123) within the same namespace (115).

Next, at 203, a request is received from a subscriber (e.g. 131) to install a particular application package within namespace 115 (e.g., application package 121). Subsequently, at 204, during installation of application package 121, the associated common library package 120 is installed within namespace 135, such that application package 121 has access to its interfaces. If, during the installation process, it is determined that common library package 120 already exists within namespace 135, then only application package 121 needs to be installed.

Figure 3:
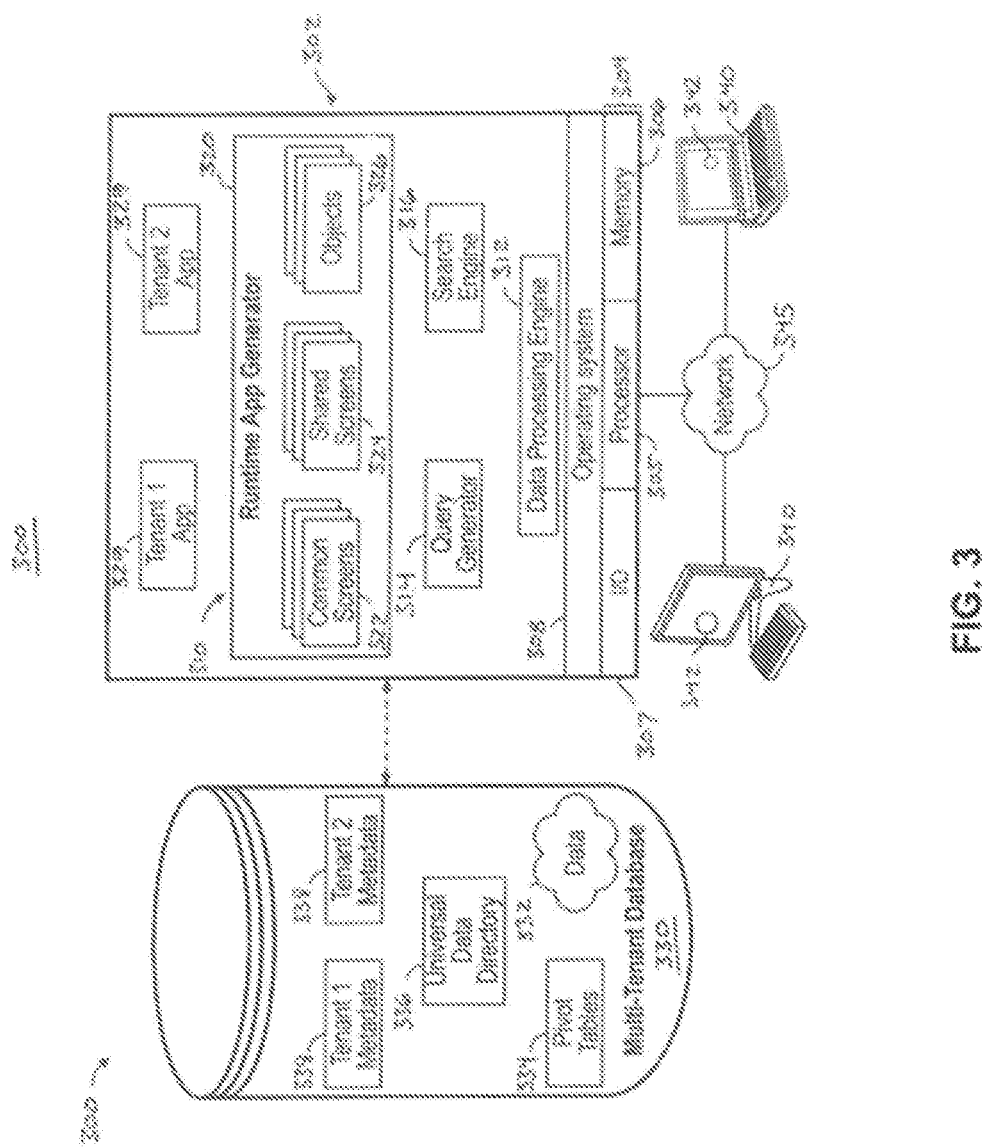
FIG. 3 is a schematic block diagram of an exemplary multi-tenant computing environment.

FIG. 3 presents, as a non-limiting example, a schematic block diagram of a multi-tenant computing environment in which the various systems and methods described herein may be implemented. Specifically, as described in further detail below, a server may be shared between multiple tenants, organizations, or enterprises, referred to herein as a multi-tenant database (or "datastore").

As used herein, a "tenant" or an "organization" should be understood as referring to a group of one or more users, subscribers, developers, partners, or the like (typically employees) that share access to common subset of the data within the multi-tenant database 330. In this regard, each tenant includes one or more users and/or groups associated with, authorized by, or otherwise belonging to that respective tenant. Stated another way, each respective user within the multi-tenant system of the service cloud 300 is associated with, assigned to, or otherwise belongs to a particular one of the plurality of enterprises supported by the system of the service cloud 300.

Each enterprise tenant may represent a company, corporate department, business or legal organization, and/or any other entities that maintain data for sets of users (such as their respective employees or customers) within the multi-tenant system of the service cloud 300. Although multiple tenants may share access to the server 302 and the multi-tenant database 330, the data and services provided from the server 302 to each tenant can be securely isolated from those provided to other tenants. The multi-tenant architecture therefore allows different sets of users to share functionality and hardware resources without necessarily sharing any of the data 332 belonging to or otherwise associated with other organizations.

The multi-tenant database 330 may be a repository or other data storage system capable of storing and managing the data 332 associated with any number of tenant organizations. The multi-tenant database 330 may be implemented using conventional database server hardware. In various embodiments, the multi-tenant database 330 shares the processing hardware 304 with the server 302. In other embodiments, the multi-tenant database 330 is implemented using separate physical and/or virtual database server hardware that communicates with the server 302 to perform the various functions described herein.

In an exemplary embodiment, the multi-tenant database 330 includes a database management system or other equivalent software capable of determining an optimal query plan for retrieving and providing a subset of the data 332 to an instance of app (or virtual app) 329 in response to a query initiated or otherwise provided by an app 329, as described in greater detail below. The multi-tenant database 330 may alternatively be referred to herein as an on-demand database, in that the multi-tenant database 330 provides (or is available to provide) data at run-time to on-demand virtual apps 329 generated by the app platform 310 as described in greater detail below.

In practice, the data 332 may be organized and formatted in any manner to support the app platform 310. In various embodiments, the data 332 is suitably organized into a relatively small number of large data tables to maintain a semi-amorphous "heap"-type format. The data 332 can then be organized as needed for a virtual app 329. In various embodiments, conventional data relationships are established using any number of pivot tables 334 that establish indexing, uniqueness, relationships between entities, and/or other aspects of conventional database organization as desired. Further data manipulation and report formatting is generally performed at run-time using a variety of metadata constructs. Metadata within a universal data directory (UDD) 336, for example, can be used to describe any number of forms, reports, workflows, user access privileges, business logic and other constructs that are common to multiple tenants.

Tenant-specific formatting, functions and other constructs may be maintained as tenant-specific metadata 338 for each tenant, as desired. Rather than forcing the data 332 into an inflexible global structure that is common to all tenants and apps, the multi-tenant database 330 is organized to be relatively amorphous, with the pivot tables 334 and the metadata 338 providing additional structure on an as-needed basis. To that end, the app platform 310 suitably uses the pivot tables 334 and/or the metadata 338 to generate "virtual" components of the virtual apps 329 to logically obtain, process, and present the relatively amorphous data from the multi-tenant database 330.

The server 302 may be implemented using one or more actual and/or virtual computing systems that collectively provide the dynamic type of app platform 310 for generating the virtual apps 329. For example, the server 302 may be implemented using a cluster of actual and/or virtual servers operating in conjunction with each other, typically in association with conventional network communications, cluster management, load balancing and other features as appropriate. The server 302 operates with any sort of processing hardware 307 which is conventional, such as a processor 305, memory 306, input/output features 307 and the like. The input/output features 307 generally represent the interface(s) to networks (e.g., to the network 345, or any other local area, wide area or other network), mass storage, display devices, data entry devices and/or the like.

The processor 305 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 306 represents any non-transitory short or long term storage or other computer-readable media capable of storing programming instructions for execution on the processor 305, including any sort of random access memory (RAM), read only memory (ROM), flash memory, magnetic or optical mass storage, and/or the like. The computer-executable programming instructions, when read and executed by the server 302 and/or processors 305, cause the server 302 and/or processors 305 to create, generate, or otherwise facilitate the app platform 310 and/or virtual apps 329 and perform one or more additional tasks, operations, functions, and/or processes described herein. It should be noted that the memory 306 represents one suitable implementation of such computer-readable media, and alternatively or additionally, the server 302 could receive and cooperate with external computer-readable media that is realized as a portable or mobile component or platform, e.g., a portable hard drive, a USB flash drive, an optical disc, or the like.

Each app 329 is suitably generated at run-time (or on-demand) using a common type of app platform 310 that securely provides access to the data 332 in the multi-tenant database 330 for each of the various tenant organizations subscribing to the service cloud 300. In accordance with one non-limiting example, the service cloud 300 is implemented in the form of an on-demand multi-tenant customer relationship management (CRM) system that can support any number of authenticated users for a plurality of tenants. Mobile tenant devices 340 might include, for example, tablets, smartphones, wearable Google Glass™, and any other computing device.

The app platform 310 is any sort of software app or other data processing engine that generates the virtual apps 329 including apps relating to arranging graphic elements in user interfaces that provide data and/or services to the tenant devices 340. In a typical embodiment, the app platform 310 gains access to processing resources, communications interface and other features of the processing hardware 304 using any sort of conventional or proprietary operating system 308. The virtual apps 329 are typically generated at run-time in response to input received from the tenant devices 340. For the illustrated embodiment, the app platform 310 includes a bulk data processing engine 312, a query generator 314, a search engine 316 that provides text indexing and another search functionality, and a runtime app generator 320. Each of these features may be implemented as a separate process or other module, and many equivalent embodiments could include different and/or additional features, components or other modules as desired.

The runtime app generator 320 dynamically builds and executes the virtual apps 329 in response to specific requests received from the tenant devices 340. The virtual apps 329 are typically constructed in accordance with the tenant-specific metadata 338, which describes the tables, reports, interfaces and/or other features of the app 329. In various embodiments, each virtual app 329 generates dynamic web content that can be served to a browser or another tenant program 342 associated with its tenant device 340, as appropriate.

The runtime app generator 320 suitably interacts with the query generator 314 to efficiently obtain data 332 from the multi-tenant database 330 as needed in response to input queries initiated or otherwise provided by users of the tenant devices 340. In a typical embodiment, the query generator 314 considers the identity of the user requesting a particular function (along with the user's associated tenant), and then builds and executes queries to the multi-tenant database 330 using system-wide metadata 336, tenant specific metadata, pivot tables 334, and/or any other available resources. The query generator 314 in this example therefore maintains security of the common database by ensuring that queries are consistent with access privileges granted to the user and/or tenant that initiated the request.

With continued reference to FIG. 3, the bulk data processing engine 312 performs bulk processing operations on the data 332 such as uploads or downloads, updates, online transaction processing, and/or the like. In many embodiments, less urgent bulk processing of the data 332 can be scheduled to occur as processing resources become available, thereby giving priority to more urgent data processing by the query generator 314, the search engine 316, the virtual apps 329, etc.

In exemplary embodiments, the app platform 310 is utilized to create and/or generate data-driven virtual apps 329 for the tenants that they support. Such virtual apps 329 may make use of interface features such as custom (or tenant-specific) screens 324, standard (or universal) screens 322 or the like. Any number of custom and/or standard objects 326 may also be available for integration into tenant-developed virtual apps 329. As used herein, "custom" should be understood as meaning that a respective object or app is tenant-specific (e.g., only available to users associated with a particular tenant in the multi-tenant system) or user-specific (e.g., only available to a particular subset of users within the multi-tenant system), whereas "standard" or "universal" apps or objects are available across multiple tenants in the multi-tenant system.

The data 332 associated with each virtual app 329 is provided to the multi-tenant database 330, as appropriate, and stored until it is requested or is otherwise needed, along with the metadata 338 that describes the particular features (e.g., reports, tables, functions, objects, fields, formulas, code, etc.) of that particular virtual app 329. For example, a virtual app 329 may include several objects 326 accessible to a tenant, wherein for each object 326 accessible to the tenant, information pertaining to its object type along with values for various fields associated with that respective object type are maintained as metadata 338 in the multi-tenant database 330. In this regard, the object type defines the structure (e.g., the formatting, functions and other constructs) of each respective object 326 and the various fields associated therewith.

Still referring to FIG. 3, the data and services provided by the server 302 can be retrieved using any sort of personal computer, mobile telephone, tablet or another network-enabled tenant device 340 on the network 345. In an exemplary embodiment, the tenant device 340 includes a display device, such as a monitor, screen, or another conventional electronic display capable of graphically presenting data and/or information retrieved from the multi-tenant database 330, as described in greater detail below.

Typically, the user operates a conventional browser app or other tenant program 342 executed by the tenant device 340 to contact the server 302 via the network 345 using a networking protocol, such as the hypertext transport protocol (HTTP) or the like. The user typically authenticates his or her identity to the server 302 to obtain a session identifier ("Session ID") that identifies the user in subsequent communications with the server 302. When the identified user requests access to a virtual app 329, the runtime app generator 320 suitably creates the app at run time based upon the metadata 338, as appropriate. However, if a user chooses to manually upload an updated file (through either the web based user interface or through an API), it will also be shared automatically with all the users/devices that are designated for sharing.

As noted above, the virtual app 329 may contain Java, ActiveX, or other content that can be presented using conventional tenant software running on the tenant device 340; other embodiments may simply provide dynamic web or other content that can be presented and viewed by the user, as desired. As described in greater detail below, the query generator 314 suitably obtains the requested subsets of data 332 from the multi-tenant database 330 as needed to populate the tables, reports or other features of the particular virtual app 329.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

"Node/Port"—As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node). As used herein, a "port" means a node that is externally accessible via, for example, a physical connector, an input or output pin, a test probe, a bonding pad, or the like.

"Connected/Coupled"—The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for securely sharing a common software package, comprising:
   storing, within a database, a set of software packages associated with a namespace wherein the namespace is a globally unique string across production instances;
   storing, within the database, a common software package associated with the set of software packages and the namespace, the common software package being obfuscated and including an access modifier;
   receiving, from a subscriber, a request to install a first software package selected from the set of software packages associated with the namespace; and
   in response to the request from the subscriber, installing the first software package and the common software package in accordance with the access modifier wherein the common software package is installed transparently to the subscriber and wherein the access modifier allows subscriber visibility to the first software package and restricts subscriber visibility to the common software package.

2. The method of claim 1, wherein the common software package comprises source code.

3. The method of claim 2, where the common software package comprises a managed object class.

4. The method of claim 1, wherein the access modifier is a class annotation.

5. The method of claim 1, wherein the access modifier is a keyword.

6. The method of claim 1, wherein the common software package is obfuscated by returning only a global signature for an object within the common software package.

7. The method of claim 1, wherein the database is multi-tenant database.

8. A non-transitory computer readable media having computer-executable instructions stored thereon and configurable to be executed by a processor to perform a method comprising:
   storing, within a database, a set of software packages associated with a namespace wherein the namespace is a globally unique string across production instances;
   storing, within the database, a common software package associated with the set of software packages and the namespace, the common software package being obfuscated and including an access modifier;
   receiving, from a subscriber, a request to install a first software package selected from the set of software packages associated with the namespace; and
   in response to the request from the subscriber, installing the first software package and the common software package in accordance with the access modifier wherein the common software package is installed transparently to the subscriber and wherein the access modifier allows subscriber visibility to the first software package and restricts subscriber visibility to the common software package.

9. The non-transitory computer readable media of claim 8, wherein the common software package comprises source code.

10. The non-transitory computer readable media of claim 8, wherein the common software package comprises a managed object class.

11. The non-transitory computer readable media of claim 8, wherein the access modifier is a class annotation.

12. The non-transitory computer readable media of claim 8, wherein the access modifier is a keyword.

13. The non-transitory computer readable media of claim 8, wherein the common software package is obfuscated by returning only a global signature for an object within the common software package.

14. The non-transitory computer readable media of claim 8, wherein the database is a multitenant database.

15. A database system comprising a hardware processor in communication with a memory element that has computer-executable instructions stored thereon and congfigurable to be executed by the hardware processor to cause the database system to:
   store, within a database, a set of software packages associated with a namespace wherein the namespace is a globally unique string across production instances;
   store, within the database, a common software package associated with the set of software packages and the namespace, the common software package being obfuscated and including an access modifier;
   receiving, from a subscriber, a request to install a first software package selected from the set of software packages associated with the namespace; and
   in response to the request from the subscriber, installing the first software package and the common software package in accordance with the access modifier wherein the common software package is installed transparently to the subscriber and wherein the access modifier allows subscriber visibility to the first software package and restricts subscriber visibility to the common software package.

16. The database system of claim 15, wherein the common software package comprises source code.

17. The database system of claim 16, where the common software package comprises a managed object class.

18. The database system of claim 15, wherein the access modifier is a class annotation.

19. The database system of claim 15, wherein the access modifier is a keyword.

20. The database system of claim 15, wherein the common software package is obfuscated by returning only a global signature for an object within the common software package.

* * * * *